United States Patent
Zhang et al.

(10) Patent No.: US 10,571,705 B2
(45) Date of Patent: Feb. 25, 2020

(54) LIQUID CRYSTAL GRATING, 3D DISPLAY DEVICE AND DRIVING METHOD THEREOF

(71) Applicants: Beijing BOE Optoelectronics Technology Co., Ltd., Beijing (CN); BOE Technology Group Co., Ltd., Beijing (CN)

(72) Inventors: Zijing Zhang, Beijing (CN); Hongliang Yuan, Beijing (CN); Yanchen Li, Beijing (CN); Xiaojuan Wu, Beijing (CN); Li Ma, Beijing (CN); Huishun Chen, Beijing (CN); Yao Bi, Beijing (CN); Qi Zheng, Beijing (CN); Zhiqiang Zhao, Beijing (CN); Yu Zhao, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/078,420

(22) PCT Filed: Jan. 4, 2018

(86) PCT No.: PCT/CN2018/070784
§ 371 (c)(1),
(2) Date: Aug. 21, 2018

(87) PCT Pub. No.: WO2018/205654
PCT Pub. Date: Nov. 15, 2018

(65) Prior Publication Data
US 2019/0353915 A1    Nov. 21, 2019

(30) Foreign Application Priority Data

May 12, 2017   (CN) .......................... 2017 1 0342405

(51) Int. Cl.
*G09G 5/00* (2006.01)
*G02B 27/22* (2018.01)
(Continued)

(52) U.S. Cl.
CPC ...... *G02B 27/2214* (2013.01); *G02F 1/13394* (2013.01); *G02F 1/134309* (2013.01); *H04N 13/366* (2018.05)

(58) Field of Classification Search
CPC ............ G02B 27/2264; H04N 13/341; H04N 13/356; H04N 13/378; H04N 13/383; H04N 13/398; H04N 2213/008
See application file for complete search history.

(56) References Cited

U.S. PATENT DOCUMENTS

| 2012/0262451 A1* | 10/2012 | Kotani | H04N 13/341 345/419 |
| 2013/0271510 A1* | 10/2013 | Matsumoto | G02B 27/2214 345/690 |

* cited by examiner

*Primary Examiner* — Insa Sadio
(74) *Attorney, Agent, or Firm* — Myers Bigel, P.A.

(57) ABSTRACT

The embodiments of the present disclosure provide a liquid crystal grating, a 3D display device, and a driving method thereof, relating to the field of display technology, and improving the 3D display effect. The liquid crystal grating includes a first substrate and a second substrate disposed opposite to each other, a liquid crystal layer and a plurality of spacers, the liquid crystal layer and the plurality of spacers being disposed between the first substrate and the second substrate, the liquid crystal grating is configured to form alternating light transmitting regions and dark state regions if power is applied, along a first direction perpendicular to an extending direction of a light transmitting region, the plurality of spacers are arranged with a period, a width of the light transmitting region is a positive integer multiple of the period.

20 Claims, 8 Drawing Sheets

(51) Int. Cl.
*G02F 1/1343* (2006.01)
*G02F 1/1339* (2006.01)
*H04N 13/366* (2018.01)

Fig. 12 obtaining an eye position of a viewer by the human eye tracking module — S10 controlling the liquid crystal grating by the driving module to form alternating light transmitting regions and dark state regions based on a current eye position of the viewer obtained by the human eye tracking module, so that a left eye of the viewer sees a left eye image displayed by the display panel through the light transmitting regions of the liquid crystal grating, and a right eye of the viewer sees a right eye image displayed by the display panel through the light transmitting regions of the liquid crystal grating — S20

Fig. 13

LIQUID CRYSTAL GRATING, 3D DISPLAY DEVICE AND DRIVING METHOD THEREOF

CROSS REFERENCE TO RELATED APPLICATIONS

The present application is a 35 U.S.C. 371 national stage application of PCT International Application No. PCT/CN2018/070784, filed on Jan. 4, 2018, which claims the priority of Chinese patent application No. 201710342405.7 filed on May 12, 2017, the disclosures of which are hereby incorporated in their entireties by reference.

TECHNICAL FIELD

The present disclosure relates to the field of display technology, and particularly to a liquid crystal grating, a 3D display device and a driving method thereof.

BACKGROUND

The three-dimensional (3D) display technology works as follows: for the same scene, the viewer's left and right eyes respectively receive images, and the distance between the two eyes of the viewer in the horizontal direction (i.e., the pupil distance, about 65 mm) causes a subtle difference in the viewing angles of the two eyes. Because of this difference, the images observed by the viewer's left and right eyes are slightly different. This difference is called "binocular parallax". After the fusion of the visual cortex of the brain, a stereoscopic effect is formed.

With the development of display technology, naked-eye 3D display is very popular. The naked-eye 3D technology refers to a display technology in which two images with a parallax are directly viewed by the left and right eyes from the display screen without any tools. These two images are sent to the brain to produce a stereoscopic picture.

SUMMARY

The embodiments of the present disclosure provide a liquid crystal grating, a 3D display device and a driving method thereof.

According to an aspect of the present disclosure, a liquid crystal grating is provided. The liquid crystal grating includes a first substrate and a second substrate disposed opposite to each other, a liquid crystal layer and a plurality of spacers, the liquid crystal layer and the plurality of spacers being disposed between the first substrate and the second substrate; the liquid crystal grating is configured to form alternating light transmitting regions and dark state regions if power is applied to the liquid crystal grating; along a first direction perpendicular to an extending direction of a light transmitting region, the plurality of spacers are arranged with a period; a width of the light transmitting region is a positive integer multiple of the period.

Optionally, the width of the light transmitting region is 40~50 μm.

Optionally, the width of the light transmitting region is 42.5 μm, 45.75 μm or 47.285 μm.

Optionally, the first substrate includes a plurality of strip-shaped first electrodes arranged in parallel, and the first electrodes are insulated from each other; the second substrate includes a second electrode configured for forming an electric field with the first electrodes; N continuously adjacent first electrodes are used to form one light transmitting region; N is a positive integer greater than or equal to 2.

Optionally, in a direction perpendicular to the first electrodes, starting from a first one of the first electrodes, Q spacers are arranged in a region where N continuously adjacent first electrodes are located; Q is a positive integer greater than or equal to 2; Q spacers are arranged in a row at equal intervals along an arranging direction of the first electrodes.

Optionally, all of the spacers are arranged in an array.

Optionally, odd numbered first electrodes are located in a same layer, even numbered first electrodes are located in a same layer; the odd numbered first electrodes and the even numbered first electrodes are separated by an insulating layer; an even numbered first electrode has portions overlapping with two odd numbered first electrodes adjacent to the even numbered first electrode.

Optionally, the number of the second electrode is one, and the second electrode is planar; alternatively, the number of the second electrode is plural, a plurality of second electrodes are arranged in parallel and insulated from each other, and the second electrodes are strip-shaped; an extending direction of the second electrode is same to an extending direction of the first electrode. The second electrodes and the first electrodes are staggered, and a second electrode has portions overlapping with two first electrodes adjacent to the second electrode.

According to another aspect of the present disclosure, a 3D display device is provided. The 3D display device includes: a display panel, the liquid crystal grating according to any one of above embodiments, a human eye tracking module, and a driving module. The human eye tracking module is configured to obtain an eye position of a viewer. The driving module is connected to the liquid crystal grating and the human eye tracking module; the driving module is configured for controlling the liquid crystal grating to form alternating light transmitting regions and dark state regions based on a current eye position of the viewer obtained by the human eye tracking module, so that a left eye of the viewer sees a left eye image displayed by the display panel through the light transmitting regions of the liquid crystal grating, and a right eye of the viewer sees a right eye image displayed by the display panel through the light transmitting regions of the liquid crystal grating.

Optionally, controlling the liquid crystal grating to form alternating light transmitting regions and dark state regions based on a current eye position of the viewer obtained by the human eye tracking module includes: based on a current eye position of the viewer obtained by the human eye tracking module, controlling voltages on the first electrodes and the second electrode, so that the liquid crystal grating forms alternating light transmitting regions and dark state regions.

Optionally, the 3D display device further includes: a processing module coupled to the human eye tracking module and configured for calculating a distance between the current eye position of the viewer and an initial position in a direction parallel to a left eye and a right eye of the viewer; the initial position is a position on which the left eye of the viewer sees a left eye image and the right eye of the viewer sees a right eye image through the light transmitting regions of the liquid crystal grating, the light transmitting regions of the liquid crystal grating are formed by factory setting voltages on the first electrodes and the second electrode. Based on a current eye position of the viewer obtained by the human eye tracking module, controlling voltages on the first electrodes and the second electrode, so that the liquid crystal grating forms alternating light transmitting regions and dark state regions includes: based on the distance between the current eye position of the viewer and the initial position obtained by the processing module, controlling voltages on the first electrodes and the second electrode according to a correspondence table between the distance and a voltage on the first electrode, so that the liquid crystal grating forms alternating light transmitting regions and dark state regions.

Optionally, the display panel is a liquid crystal display panel, and the liquid crystal grating is disposed on a light entrance side or a light exit side of the liquid crystal display panel. Alternatively, the display panel is an OLED display panel, and the liquid crystal grating is disposed on a light exit side of the OLED display panel.

According to yet another aspect of the present disclosure, a method for driving the 3D display device according to any one of the above embodiments is provided. The method includes: obtaining an eye position of a viewer by the human eye tracking module; and controlling the liquid crystal grating by the driving module to form alternating light transmitting regions and dark state regions based on a current eye position of the viewer obtained by the human eye tracking module, so that a left eye of the viewer sees a left eye image displayed by the display panel through the light transmitting regions of the liquid crystal grating, and a right eye of the viewer sees a right eye image displayed by the display panel through the light transmitting regions of the liquid crystal grating.

Optionally, the step of controlling the liquid crystal grating by the driving module to form alternating light transmitting regions and dark state regions based on a current eye position of the viewer obtained by the human eye tracking module includes: based on a current eye position of the viewer obtained by the human eye tracking module, controlling voltages on the first electrodes and the second electrode by the driving module, so that the liquid crystal grating forms alternating light transmitting regions and dark state regions.

Optionally, the method further includes: calculating a distance between the current eye position of the viewer and an initial position in a direction parallel to a left eye and a right eye of the viewer by a processing module; the initial position is a position on which the left eye of the viewer sees a left eye image and the right eye of the viewer sees a right eye image through the light transmitting regions of the liquid crystal grating, the light transmitting regions of the liquid crystal grating are formed by factory setting voltages on the first electrodes and the second electrode. The step of based on a current eye position of the viewer obtained by the human eye tracking module, controlling voltages on the first electrodes and the second electrode by the driving module, so that the liquid crystal grating forms alternating light transmitting regions and dark state regions includes: based on the distance between the current eye position of the viewer and the initial position obtained by the processing module, controlling voltages on the first electrodes and the second electrode by the driving module according to a correspondence table between the distance and a voltage on the first electrode, so that the liquid crystal grating forms alternating light transmitting regions and dark state regions.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

FIG. 4b is a schematic diagram in which the viewer is in another position different from FIG. 4a;

DETAILED DESCRIPTION OF THE DISCLOSURE

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

Figure 1:
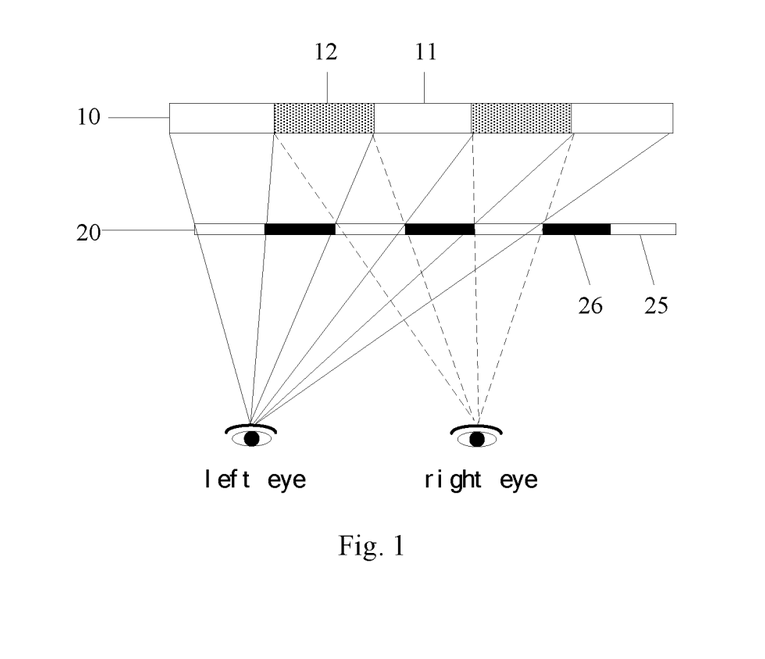
FIG. 1 is a schematic diagram of a naked-eye 3D display device in the related art.

As shown in FIG. 1, a naked-eye 3D display device in the related art includes a display panel 10 and a liquid crystal grating 20 on the light exit side of the display panel 10 (the liquid crystal grating 20 can also be disposed on the light entrance side of the display panel 10). The display panel 10 includes a plurality of first pixel groups 11 and a plurality of second pixel groups 12. The first pixel groups 11 display a left eye image and the second pixel groups 12 display a right eye image. The liquid crystal grating 20 includes light transmitting regions 25 and dark state regions 26. The liquid crystal grating 20 has an image division effect. As shown in FIG. 1, the left eye can only see the left eye image, and the right eye can only see the right eye image, thereby producing a stereoscopic effect.

In order to support the cell thickness of the liquid crystal grating 20, the liquid crystal grating 20 includes spacers. Since there is no black matrix in the liquid crystal grating 20, the spacers are exposed in the light transmitting regions 25, and the spacers affect the light transmittance. Therefore, the design of the spacers in the liquid crystal grating 20 directly affects the 3D display effect.

At present, the spacers in the liquid crystal grating 20 are generally disposed at the positions corresponding to the black matrix of the display panel 10. However, when the viewer moves from one viewpoint to another, the number of spacers exposed in the display area of the 3D display device may change, thereby causing uneven brightness of the screen, resulting in stain defect, and affecting the 3D display effect.

Figure 2:
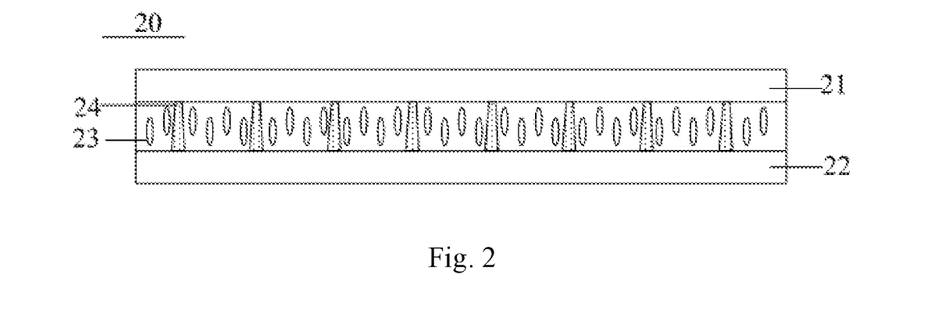
FIG. 2 is a structural schematic diagram of a liquid crystal grating according to an embodiment of the present disclosure.
Figure 3A:
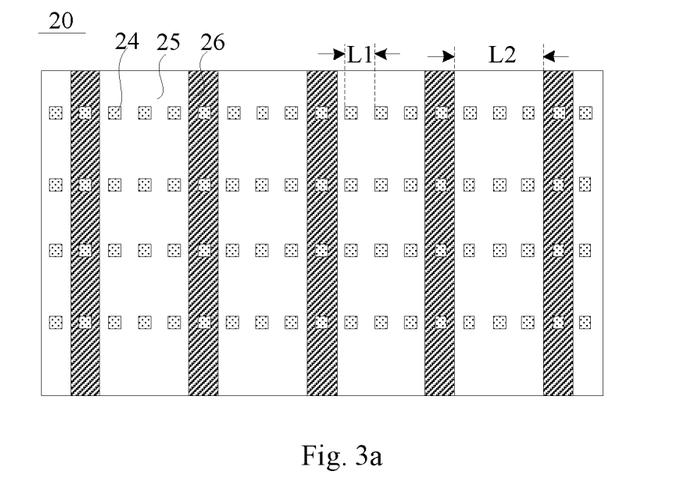
FIG. 3a is a schematic diagram of a liquid crystal grating when it is powered on according to an embodiment of the present disclosure.
Figure 3B:
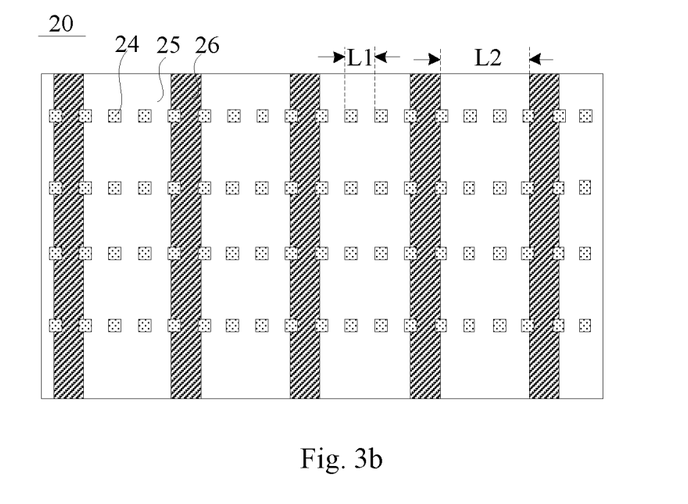
FIG. 3b is a schematic diagram of the liquid crystal grating in the embodiment shown in FIG. 3a with translated light transmitting regions.
Figure 4A:
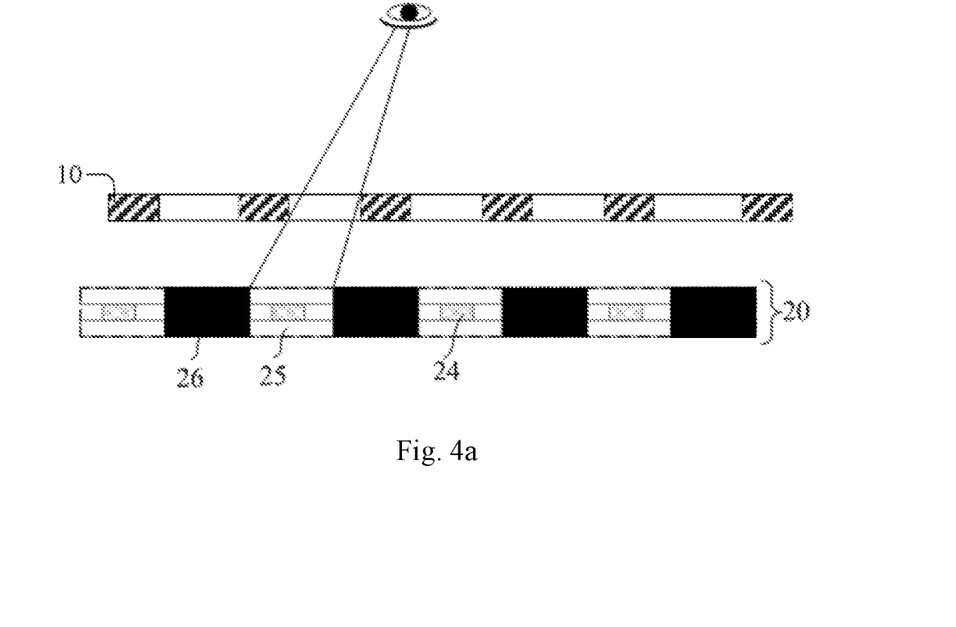
FIG. 4a is a schematic diagram of a liquid crystal grating applied to a 3D display device when a viewer is in a certain position.
Figure 4B:
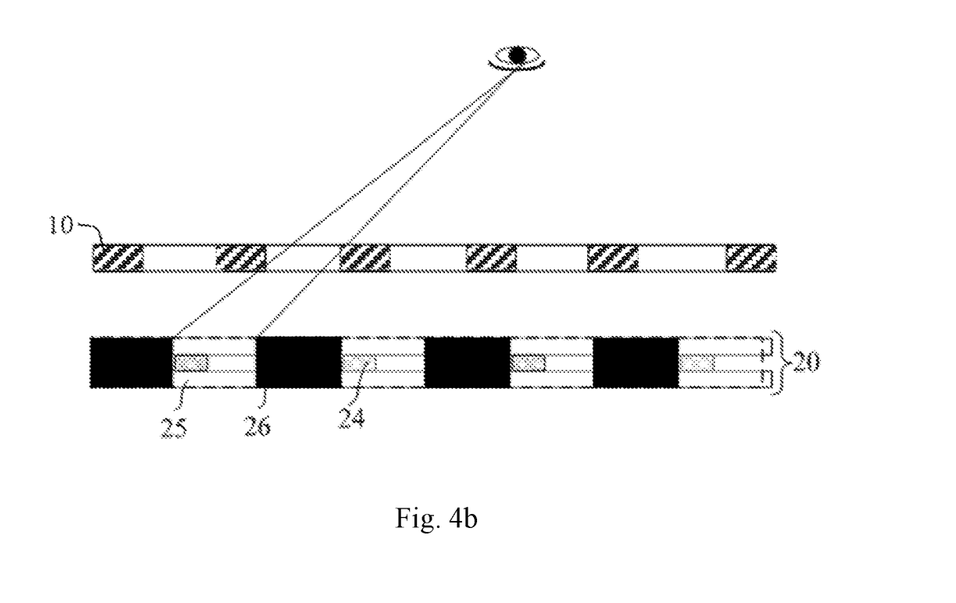

As shown in FIG. 2, an embodiment of the present disclosure provides a liquid crystal grating 20. The liquid crystal grating 20 includes a first substrate 21 and a second substrate 22 disposed opposite to each other, a liquid crystal layer 23 and a plurality of spacers 24 disposed between the first substrate 21 and the second substrate 22. As shown in FIG. 3a and FIG. 3b, the liquid crystal grating 20 is configured to form alternating light transmitting regions 25 and dark state regions 26 if power is applied to the liquid crystal grating 20. Along a first direction perpendicular to an extending direction of a light transmitting region 25, the plurality of spacers 24 are arranged with a period; a width of the light transmitting region 25 is a positive integer multiple of the period.

The liquid crystal grating 20 can be applied to a 3D display device, and the position of the viewer may change. In order to allow the viewer to experience the 3D effect at different positions, the position of the light transmitting regions 25 should be adjusted so that at different positions, the left eye image can be seen by the viewer's left eye through the light transmitting regions 25, and the right eye image can be seen by the viewer's right eye through the light transmitting regions 25.

The specific structures of the first substrate 21 and the second substrate 22 are not limited. In the embodiments of the present disclosure, the liquid crystal in the liquid crystal layer 23 can be controlled by an electric field, thus the liquid crystal grating 20 forms alternating light transmitting regions 25 and dark state regions 26 (as shown in FIG. 3a). The positions of the light transmitting regions 25 and the dark state regions 26 are adjustable, so that the left eye image can be seen by the viewer's left eye through the light transmitting regions 25, and the right eye image can be seen by the viewer's right eye through the light transmitting regions 25.

FIG. 3b is a schematic diagram of the liquid crystal grating in the embodiment shown in FIG. 3a with translated light transmitting regions. Though the light transmitting regions have been translated, the total number of the spacers 24 that can be seen is constant.

When the width of the light transmitting region is a positive integer multiple of the distribution period of the spacers, regardless of the positions of the light transmitting regions 25, the number of the spacers 24 located in the light transmitting regions 25 is constant. That is, regardless of the position of the viewer, the total number of the spacers 24 that can be seen is constant (as shown in FIGS. 3a, 3b, 4a and 4b).

It should be noted that, in the embodiment shown in FIG. 3a and FIG. 3b, the width L2 of the transmitting region 25 is three times the distribution period L1 of the spacers, but the disclosure is not limited thereto. The width L2 of the light transmitting region 25 may be 4 or 5 times (or the like) the distribution period L1 of the spacers, as long as a 3D image can be produced.

Figure 5:
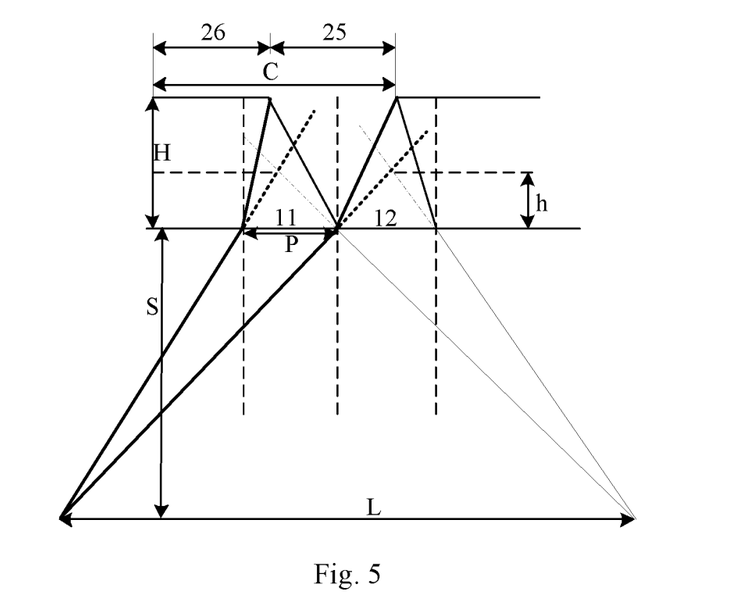
FIG. 5 is a light path diagram of a liquid crystal grating applied to a 3D display device according to an embodiment of the present disclosure.

FIG. 5 is a light path diagram of a liquid crystal grating 20 applied to a 3D display device, and the following relationship may be used.

$$\frac{h+S}{h} = \frac{P}{L} \rightarrow 1 + \frac{S}{h} = \frac{L}{P};$$

$$\frac{C}{2P} = \frac{S+h}{S} \rightarrow 1 + \frac{h}{S} = \frac{C}{2P}.$$

From the above relationship, it can be derived that:

$$C = \frac{2PL}{L-P},$$

and $$S = \frac{h(L-P)}{P}.$$

P is the width of the pixel unit; H is the height of the liquid crystal grating 20 relative to the display panel; h=H/n, n is the refractive index of the liquid crystal grating; S is the optimal viewing distance; C is the sum of the width of one light transmitting region 25 and the width of one dark state region 26 in the liquid crystal grating 20; L is the interpupillary distance.

Based on this, the value of C and the value of S can be calculated from the known H, L, and P. In some embodiments, the width of the light transmitting region 25 is equal to the width of the dark state region 26, the width of the light transmitting region 25 can thus be obtained according to the value of C.

The embodiment of the present disclosure provides a liquid crystal grating 20. Since the spacers 24 may slightly affect the light transmittance, along the first direction perpendicular to the extending direction of a light transmitting region 25, the plurality of spacers 24 are arranged with a period, and a width L2 of the light transmitting region 25 is a positive integer multiple of the distribution period L1 of the spacers 24. When the liquid crystal grating 20 is applied to a 3D display device, the total number of the spacers 24 that the viewer can see is constant when the viewer moves. Therefore, there will be no significant change in brightness due to a change on the number of the spacers 24 seen by the viewer. The liquid crystal grating 20 of the present disclosure can thus be applied to a 3D display device to improve the 3D display effect.

Optionally, the width of the light transmitting region is 40~50 μm.

Since the width L2 of the light transmitting region 25 is a positive integer multiple of the distribution period L1 of the spacer 24, the width C of one light transmitting region 25 and one dark state region 26 can be calculated according to the above relationship.

$$C = \frac{2PL}{L-P}.$$

According to the C value, in the case where, for example, the widths of the light transmitting region 25 and the dark state region 26 are equal, the width value of the light transmitting region 25 can be calculated.

Based on this, the width of the light transmitting region 25 can be obtained according to the interpupillary distance (generally 65 mm) and the width of the pixel unit of the display panel in the 3D display device to which the liquid crystal grating 20 is applied. When the 3D display device is a handheld electronic device such as a mobile phone, the width of the light transmitting region 25 is 40~50 μm.

For example, when the 3D display device is a mobile phone, the optimal viewing distance is 30-40 cm, according to the configuration of the product parameters, the width of the light transmitting region 25 can be set to 47.285 μm. A suitable adjustment can be performed on the basis of 47.285 μm according to the actual 3D effect. For example, values such as 42.5 μm and 45.75 μm can be used.

Figure 6:
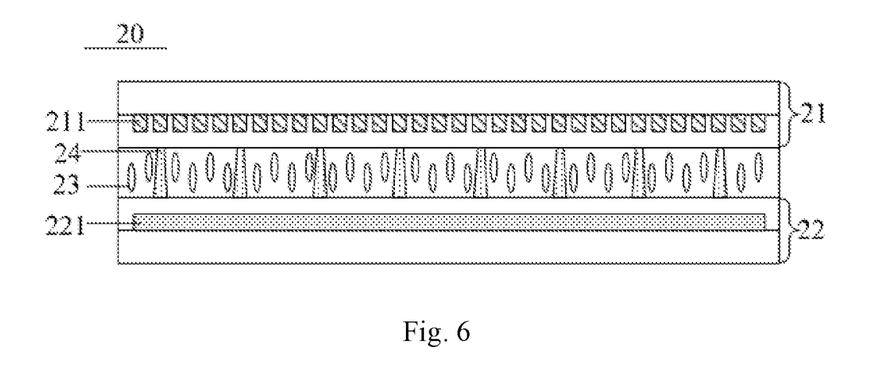
FIG. 6 is a structural schematic diagram of a liquid crystal grating according to an embodiment of the present disclosure.

Optionally, as shown in FIG. 6, the first substrate 21 includes a plurality of strip-shaped first electrodes 211 arranged in parallel, and the first electrodes 211 are insulated from each other; the second substrate 22 includes a second electrode 221 configured for forming an electric field with the first electrodes 211. N continuously adjacent first electrodes 211 are used to form one light transmitting region 25; N is a positive integer greater than or equal to 2.

Here, N continuously adjacent first electrodes 211 are used to form one light transmitting region 25, that is, the same voltage can be applied to N continuously adjacent first electrodes 211, so that the liquid crystal deflection in the region of these N continuously adjacent first electrodes 211 is the same, and the light may be transmitted, thereby forming a light transmitting region 25.

Since the liquid crystal grating 20 is constructed to form alternating light transmitting regions 25 and dark state regions 26 if power is applied, each light transmitting region 25 includes N continuously adjacent first electrodes 211. A first voltage can be applied to N continuously adjacent first electrodes 211 at intervals of M continuously adjacent first electrodes 211, so that the region of these N continuously adjacent first electrodes 211 forms a light transmitting region 25. On this basis, a second voltage can be applied to these M continuously adjacent first electrodes 211, so that the region of these M continuously adjacent first electrodes 211 forms a dark state region. M is a positive integer greater than or equal to 2.

When the position of the viewer changes, the positions of the light transmitting regions 25 and the dark state regions 26 should change. Therefore, along a direction perpendicular to the first electrode 211, the first one of the N continuously adjacent first electrodes is not fixed.

Specifically, along the direction perpendicular to the first electrode 211, the first voltage can be applied on Pth~(P+N−1)th first electrodes 211, so that the region of Pth~(P+N−1)th first electrodes 211 forms a light transmitting region 25; the second voltage can be applied on (P+N)th~(P+N+M−1)th first electrodes 211, so that the region of (P+N)th~(P+N+M−1)th first electrodes 211 forms a dark state region 26; the first voltage is also applied on (P+N+M)th~(P+2N+M−1)th first electrodes 211, so that the region of (P+N+M)th~(P+2N+M−1)th first electrodes 211 forms a light transmitting region 25; the second voltage is also applied on (P+2N+M)th~(P+2N+2M−1)th first electrodes 211, so that the region of (P+2N+M)th~(P+2N+2M−1)th first electrodes 211 forms a dark state region 26, and so on. The first voltage is applied to N continuously adjacent first electrodes 211 at intervals of M continuously adjacent first electrodes 211, and the second voltage is applied to these M continuously adjacent first electrodes 211 for the formation of the dark state regions 26. P is a positive integer greater than or equal to 1.

Figure 7:
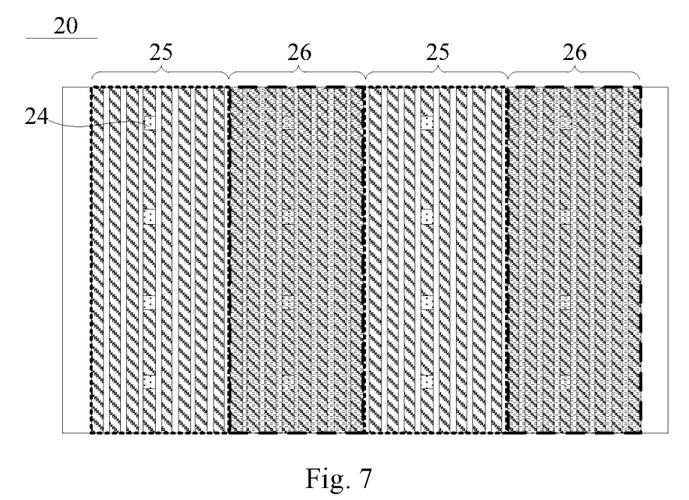
FIG. 7 is a schematic diagram of a liquid crystal grating when it is powered on according to an embodiment of the present disclosure.

For example, as shown in FIG. 7, in the direction perpendicular to the first electrode 211, the first voltage is applied on 1st~8th first electrodes 211, so that the region of 1st~8th first electrodes 211 forms a light transmitting region 25; the second voltage is applied on 9th~16th first electrodes 211, so that the region of 9th~16th first electrodes 211 forms a dark state region 26; the first voltage is also applied on 17th~24th first electrodes 211, so that the region of 17th~24th first electrodes 211 forms a light transmitting region 25; the second voltage is also applied on 25th~32nd first electrodes 211, so that the region of 25th~32nd first electrodes 211 forms a dark state region 26.

It should be noted that P=1 is taken as an example. P may be equal to 1, or may be equal to 2, 3, 4, etc., depending on the eye position of the viewer. When P=2, the first voltage is applied on 2nd~9th first electrodes 211, so that the region of 2nd~9th first electrodes 211 forms a light transmitting region 25; the second voltage is applied on 10th~19th first electrodes 211, so that the region of 10th~19th first electrodes 211 forms a dark state region 26; and so on. When P=3, the first voltage is applied on 3rd~10th first electrodes 211, so that the region of 3rd~10th first electrodes 211 forms a light transmitting region 25; the second voltage is applied on 11th~18th first electrodes 211, so that the region of 11th~18th first electrodes 211 forms a dark state region 26; and so on.

In addition, in practical applications, the larger the value of N, the more accurate the position adjustment of the light transmitting region 25 and the dark state region 26 in accordance with the position of the viewer is. Therefore, it can be determined based on the specific processes and the 3D viewing requirements.

The values of N and M may be equal or different, as long as the widths of the light transmitting region 25 and the dark state region 26 are equal.

In the embodiment of the present disclosure, by providing a plurality of mutually insulated first electrodes 211 on the first substrate 21, the starting first electrode 211 for forming the light transmitting region 25 can be flexibly selected according to the eye position of the viewer. Therefore, the position of the light transmitting region 25 can be adjusted in time according to the position of the viewer, so that a good naked-eye 3D display effect can be achieved for any position of the viewer.

Figure 8:
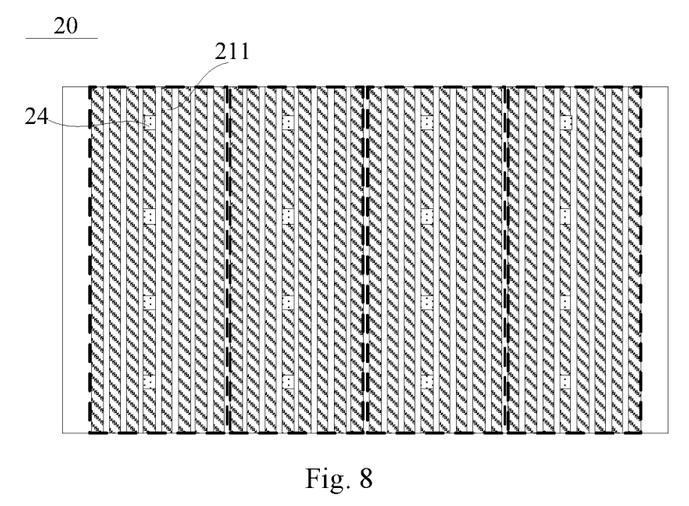
FIG. 8 is a schematic diagram of an arrangement of the spacers according to an embodiment of the present disclosure.

Optionally, as shown in FIG. 8, in the direction perpendicular to the first electrodes, starting from a first one of the first electrodes 211, Q spacers 24 are arranged in a region where N continuously adjacent first electrodes 211 are located (i.e., the region indicated with the dotted box in FIG. 8); Q is a positive integer greater than or equal to 2; and Q spacers 24 are arranged in a row at equal intervals along an arranging direction of the first electrodes 211.

It should be noted that the region where N first electrodes 211 are located refers to a region starting from the 1st first electrode 211 to the N−1th first electrode 211, or a region starting from the Nth first electrode 211 to the (2N−1)th first electrode 211, and so on.

Optionally, all of the spacers 24 are arranged in an array.

In this manner, it is convenient to fabricate the liquid crystal grating, and the naked-eye 3D display effect can be improved.

Figure 9:
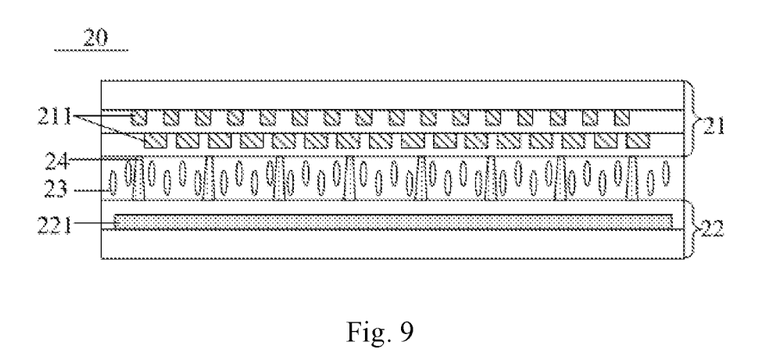
FIG. 9 is a structural schematic diagram of a liquid crystal grating according to another embodiment of the present disclosure.

Optionally, as shown in FIG. 9, the odd numbered first electrodes 211 are located in a same layer, and the even numbered first electrodes 211 are located in a same layer. The odd numbered first electrodes 211 and the even numbered first electrodes 211 are separated by an insulating layer; an even numbered first electrode 211 has portions overlapping with two odd numbered first electrodes adjacent to this even numbered first electrode.

In some embodiments, the odd numbered first electrodes 211 are arranged at equal intervals, and the even numbered first electrodes 211 are arranged at equal intervals.

In some embodiments, the odd numbered first electrodes 211 and the even numbered first electrodes 211 are respectively arranged in two layers. On the one hand, when N continuously adjacent first electrodes 211 are used to form a light transmitting region 25, since an even numbered first electrode 211 has portions overlapping with two odd numbered first electrodes 211 adjacent to this even numbered first electrode 211, there is no gap between the N continuously adjacent first electrodes 211, therefore the light transmitting region 25 is transparent and the brightness is uniform; when M continuously adjacent first electrodes 211 are used to form a dark state region 26, it can be ensured that the dark state region 26 is opaque. On the other hand, the process difficulty can be reduced, and the number of the first electrodes 211 can be more.

Optionally, as shown in FIG. 6 and FIG. 9, the number of the second electrode 221 is one, and the second electrode 221 is planar. Based on this, the process of forming the second electrode 221 is relatively simple, and the driving mode for the second electrode 221 can also be relatively simple.

Figure 10:
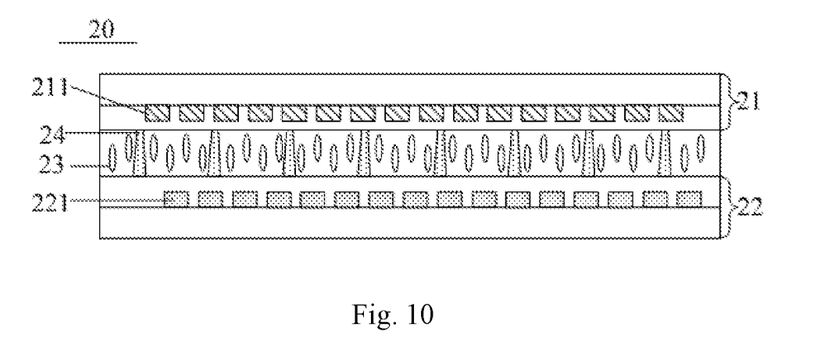
FIG. 10 is a structural schematic diagram of a liquid crystal grating according to yet another embodiment of the present disclosure.

Alternatively, as shown in FIG. 10, the number of the second electrode 221 is plural, a plurality of second electrodes 221 are arranged in parallel and insulated from each other, and the second electrodes 221 are strip-shaped; an extending direction of the second electrode 221 is same to an extending direction of the first electrode 211. The second electrodes 221 and the first electrodes 211 are staggered. A second electrode 221 has portions overlapping with two first electrodes 211 adjacent to this second electrode 221.

In some embodiments, a plurality of second electrodes 221 are disposed in the liquid crystal grating, so that voltages can be respectively applied to the second electrodes 221. On the basis of this, each second electrode 221 has portions overlapping with two first electrodes 211 adjacent to this second electrode 221, the control of the light transmitting regions 25 and the dark state regions 26 in the liquid crystal grating 20 can be more accurate.

Figure 11:
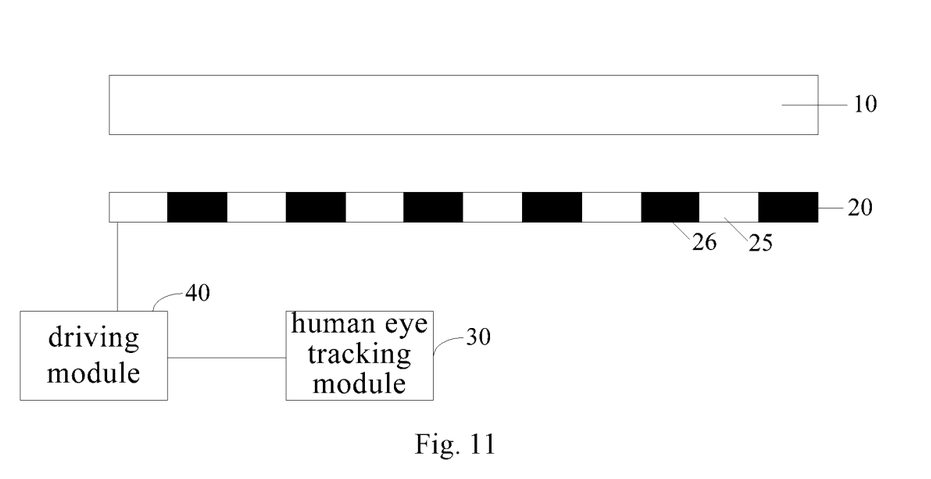
FIG. 11 is a schematic diagram of a 3D display device according to an embodiment of the present disclosure.

An embodiment of the present disclosure provides a 3D display device. As shown in FIG. 11, the 3D display device includes: a display panel 10, the liquid crystal grating 20 according to any one of above embodiments, a human eye tracking module 30, and a driving module 40.

The human eye tracking module 30 is configured to obtain an eye position of a viewer.

The driving module 40 is connected to the liquid crystal grating 20 and the human eye tracking module 30; the driving module 40 is configured for controlling the liquid crystal grating 20 to form alternating light transmitting regions 25 and dark state regions 26 based on a current eye position of the viewer obtained by the human eye tracking module 30, so that a left eye of the viewer sees a left eye image displayed by the display panel through the light transmitting regions 25 of the liquid crystal grating 20, and a right eye of the viewer sees a right eye image displayed by the display panel through the light transmitting regions 25 of the liquid crystal grating 20.

In the context of the disclosure, each "module" in the embodiments can be realized by a computer (e.g. personal computer) or a combination of a computer and a suitable sensor; the processing of each "module" can be realized e.g. by a processor in the computer. Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

According to the 3D display device provided by the embodiment of the present disclosure, the eye position of the viewer is obtained by the human eye tracking module 30, and the driving module 40 controls the liquid crystal grating 20 to form alternating light transmitting regions 25 and dark state regions 26 based on the current eye position of the viewer. In this way, the left eye of the viewer sees the left eye image displayed by the display panel through the light transmitting regions 25 of the liquid crystal grating 20, and the right eye of the viewer sees the right eye image displayed by the display panel through the light transmitting regions 25. Since the position of the light transmitting regions 25 can be adjusted in time according to the position of the viewer, a good naked-eye 3D display effect can be achieved for any position of the viewer. The width of the light transmitting region is a positive integer multiple of the distribution period of the spacers. In this manner, the total number of the spacers 24 that the viewer can see is constant when the viewer moves. Therefore, there will be no significant change in brightness due to a change on the number of the spacers 24 seen by the viewer. The liquid crystal grating 20 of the present disclosure can thus be applied to a 3D display device to improve the 3D display effect.

Optionally, controlling the liquid crystal grating to form alternating light transmitting regions 25 and dark state regions 26 based on a current eye position of the viewer obtained by the human eye tracking module 30 includes: based on a current eye position of the viewer obtained by the human eye tracking module 30, controlling voltages on the first electrodes 211 and the second electrode 221 by the driving module 40, so that the liquid crystal grating 20 forms alternating light transmitting regions 25 and dark state regions 26.

In the embodiment of the present disclosure, a plurality of first electrodes 211 mutually insulated are disposed on the first substrate 21. According to the position of the viewer, N continuously adjacent first electrodes 211 can be selected flexibly for forming the light transmitting regions 25. The first voltage is applied to these N continuously adjacent first electrodes 211. After selecting these N continuously adjacent first electrodes 211 for forming the light transmitting regions 25, M continuously adjacent first electrodes 211 for forming the dark state regions 26 can also be determined.

The second voltage is applied to these M continuously adjacent first electrodes 211. Thus, in the embodiment of the present disclosure, by controlling the voltages applied on the first electrodes 211 and the second electrode 221, a good naked-eye 3D display effect can be achieved for any position of the viewer.

Figure 12:
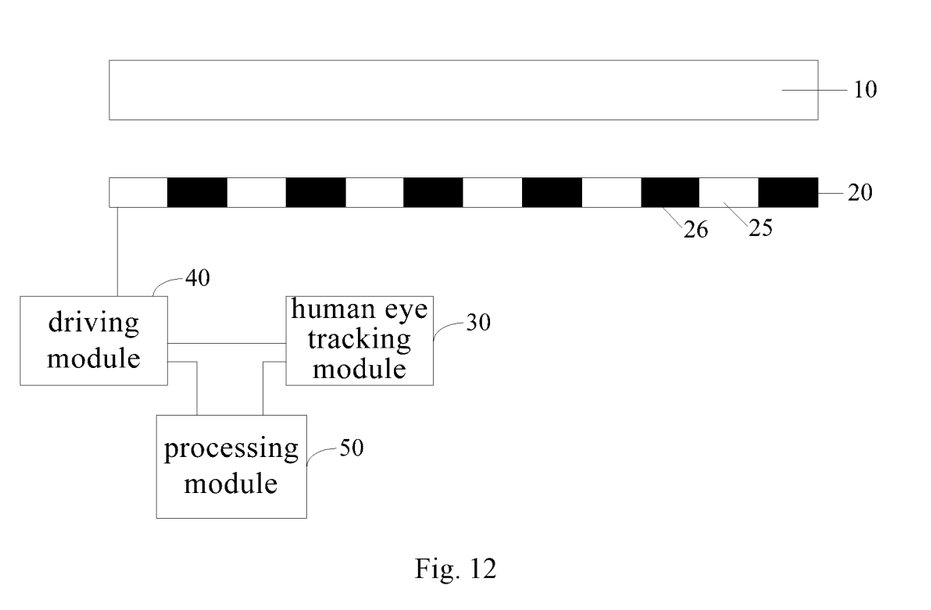
FIG. 12 is a schematic diagram of a 3D display device according to another embodiment of the present disclosure.

Optionally, as shown in FIG. 12, the 3D display device further includes a processing module 50. The processing module 50 is coupled to the human eye tracking module 30 and configured for calculating a distance between the current eye position of the viewer and an initial position in a direction parallel to a left eye and a right eye of the viewer. The initial position is a position on which the left eye of the viewer sees a left eye image and the right eye of the viewer sees a right eye image through the light transmitting regions 25 of the liquid crystal grating 20, the light transmitting regions 25 of the liquid crystal grating 20 are formed by factory setting voltages on the first electrodes 211 and the second electrode 221.

Based on a current eye position of the viewer obtained by the human eye tracking module 30, the driving module 40 controls voltages on the first electrodes 211 and the second electrode 221, so that the liquid crystal grating 20 forms alternating light transmitting regions 25 and dark state regions 26. This can be realized by the following step: based on the distance between the current eye position of the viewer and the initial position obtained by the processing module 50, the driving module 40 controls voltages on the first electrodes 211 and the second electrode 221 according to a correspondence table between this distance and a voltage on the first electrode 211, so that the liquid crystal grating 20 forms alternating light transmitting regions 25 and dark state regions 26. In this way, the control process can be simplified.

The correspondence table between the distance and a voltage on the first electrode 211 can be pre-stored. The distance is a distance between the current eye position of the viewer and the initial position.

Based on the above, the display panel 10 can be a liquid crystal display panel. In this situation, the liquid crystal grating 20 can be disposed on a light entrance side or a light exit side of the liquid crystal display panel. For example, in FIG. 4a and FIG. 4b, the display panel 10 is a liquid crystal display panel, and the liquid crystal grating 20 is disposed on the light entrance side of the liquid crystal display panel.

If the display panel 10 is an OLED (Organic Light Emitting Diode) display panel, a liquid crystal display panel, an electronic ink screen, or an electrowetting display panel, the liquid crystal grating 20 can be disposed on the light exit side of the display panel.

Figure 13:
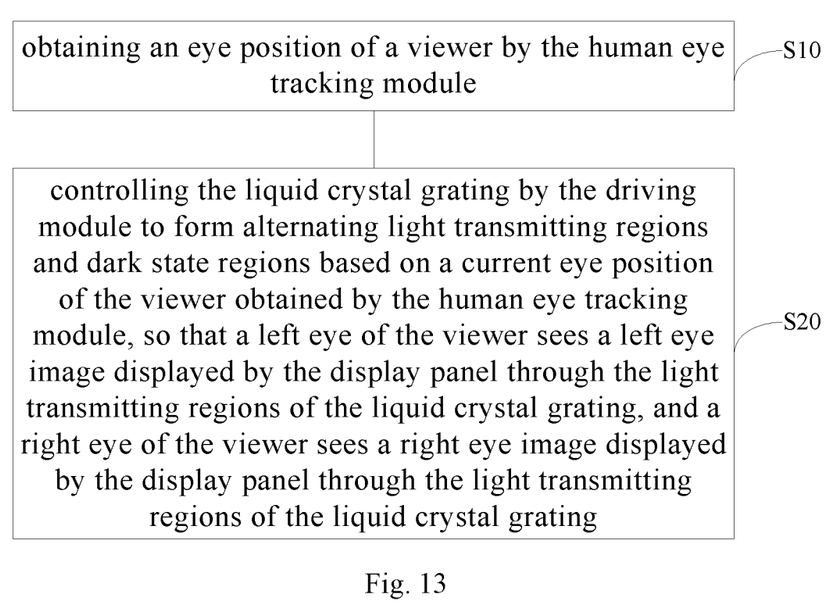
FIG. 13 is a flowchart of a method for driving a 3D display device according to an embodiment of the present disclosure.

An embodiment of the present disclosure provides a method for driving the 3D display device according to any one of the above embodiments. As shown in FIG. 13, the method includes the following steps: S10 obtaining an eye position of a viewer by the human eye tracking module 30; and S20 controlling the liquid crystal grating 20 by the driving module 40 to form alternating light transmitting regions 25 and dark state regions 26 based on a current eye position of the viewer obtained by the human eye tracking module 30, so that a left eye of the viewer sees a left eye image displayed by the display panel through the light transmitting regions 25 of the liquid crystal grating 20, and a right eye of the viewer sees a right eye image displayed by the display panel through the light transmitting regions 25 of the liquid crystal grating 20.

Optionally, the step of controlling the liquid crystal grating 20 by the driving module 40 to form alternating light transmitting regions 25 and dark state regions 26 based on a current eye position of the viewer obtained by the human eye tracking module 30 includes: based on a current eye position of the viewer obtained by the human eye tracking module 30, controlling voltages on the first electrodes 211 and the second electrode 221 by the driving module 40, so that the liquid crystal grating 20 forms alternating light transmitting regions 25 and dark state regions 26.

According to the method for driving the 3D display device provided by the embodiment of the present disclosure, the eye position of the viewer is obtained by the human eye tracking module 30, and the driving module 40 controls the liquid crystal grating 20 to form alternating light transmitting regions 25 and dark state regions 26 based on the current eye position of the viewer. In this way, the left eye of the viewer sees the left eye image displayed by the display panel through the light transmitting regions 25 of the liquid crystal grating 20, and the right eye of the viewer sees the right eye image displayed by the display panel through the light transmitting regions 25. Since the position of the light transmitting regions 25 can be adjusted in time according to the position of the viewer, a good naked-eye 3D display effect can be achieved for any position of the viewer. The width of the light transmitting region is a positive integer multiple of the distribution period of the spacers. In this manner, the total number of the spacers 24 that the viewer can see is constant when the viewer moves. Therefore, there will be no significant change in brightness due to a change on the number of the spacers 24 seen by the viewer. The liquid crystal grating 20 of the present disclosure can thus be applied to a 3D display device to improve the 3D display effect.

Optionally, the method further includes: calculating a distance between the current eye position of the viewer and an initial position in a direction parallel to a left eye and a right eye of the viewer by a processing module 50; the initial position is a position on which the left eye of the viewer sees a left eye image and the right eye of the viewer sees a right eye image through the light transmitting regions 25 of the liquid crystal grating 20, the light transmitting regions 25 of the liquid crystal grating 20 are formed by factory setting voltages on the first electrodes 211 and the second electrode 221.

The step of based on a current eye position of the viewer obtained by the human eye tracking module 30, controlling voltages on the first electrodes 211 and the second electrode 221 by the driving module 40, so that the liquid crystal grating 20 forms alternating light transmitting regions 25 and dark state regions 26 includes: based on the distance between the current eye position of the viewer and the initial position obtained by the processing module 50, controlling voltages on the first electrodes 211 and the second electrode 221 by the driving module 40 according to a correspondence table between the distance and a voltage on the first electrode 211, so that the liquid crystal grating 20 forms alternating light transmitting regions 25 and dark state regions 26. In this way, the control process can be simplified.

The embodiments of the present disclosure provide a liquid crystal grating, a 3D display device, and a driving method thereof. Since the spacers may slightly affect the light transmittance, along the first direction perpendicular to the extending direction of a light transmitting region, the plurality of spacers are arranged with a period, and a width of the light transmitting region is a positive integer multiple of the period. When the liquid crystal grating is applied to a 3D display device, the total number of the spacers that the viewer can see is constant when the viewer moves. Therefore, there will be no significant change in brightness due to a change on the number of the spacers seen by the viewer. The liquid crystal grating of the present disclosure can thus be applied to a 3D display device to improve the 3D display effect.

It can be understood that the above embodiments are merely exemplary embodiments used for illustrating the principle of the present disclosure, and the present disclosure is not limited thereto. For a person of ordinary skill in the art, variations and improvements may be made without departing from the spirit and essence of the present disclosure.

These variations and improvements are also considered to be within the scope of the present disclosure.

What is claimed is:

1. A liquid crystal grating, comprising:
  a first substrate and a second substrate opposite to each other;
  a liquid crystal layer and a plurality of spacers, wherein the liquid crystal layer and the plurality of spacers are between the first substrate and the second substrate,
  wherein the liquid crystal grating is configured to form alternating light transmitting regions and dark state regions when power is applied to the liquid crystal grating,
  wherein along a first direction perpendicular to an extending direction of a light transmitting region of the light transmitting regions, the plurality of spacers are arranged periodically spaced apart by a distance comprising a period, and
  wherein a width of the light transmitting region is a positive integer multiple of the period.

2. The liquid crystal grating according to claim 1, wherein the width of the light transmitting region is 40 μm to 50 μm.

3. The liquid crystal grating according to claim 1, wherein the width of the light transmitting region is 42.5 μm, 45.75 μm or 47.285 μm.

4. The liquid crystal grating according to claim 1,
  wherein the first substrate comprises a plurality of first electrodes that are strip-shaped and arranged in parallel to each other,
  wherein ones of the plurality of the first electrodes are insulated from each other,
  wherein the second substrate comprises a second electrode configured to form an electric field with ones of the plurality of the first electrodes,
  wherein N continuously adjacent first electrodes of the plurality of first electrodes are used to form the light transmitting region,
  wherein N is a positive integer greater than or equal to 2.

5. The liquid crystal grating according to claim 4,
  wherein in a direction perpendicular to the plurality of the first electrodes, starting from a first one of the plurality of the first electrodes, Q spacers of the plurality of spacers are arranged in a region where the N continuously adjacent first electrodes are located,
  wherein Q is a positive integer greater than or equal to 2, and
  wherein the Q spacers are arranged in a row at equal intervals along the plurality of the first electrodes.

6. The liquid crystal grating according to claim 1, wherein the plurality of spacers are arranged in an array.

7. The liquid crystal grating according to claim 1,
  wherein odd numbered ones of the plurality of first electrodes are located in a first layer, even numbered ones of the plurality of first electrodes are located in a second layer, and the odd numbered ones of the plurality of first electrodes and the even numbered ones of the plurality of first electrodes are separated by an insulating layer;
  wherein an even numbered first electrode of the plurality of first electrodes has portions overlapping with two of the odd numbered first electrodes of the plurality of first electrodes that are adjacent to the even numbered first electrode.

8. The liquid crystal grating according to claim 4, wherein the second electrode is planar.

9. A 3D display device, comprising:
  a display panel;
  the liquid crystal grating according to claim 1;
  a human eye tracking module; and
  a driving module,
  wherein the human eye tracking module is configured to obtain an eye position of a viewer,
  wherein the driving module is connected to the liquid crystal grating and the human eye tracking module,
  wherein the driving module is configured to control the liquid crystal grating to form the alternating light transmitting regions and the dark state regions based on a current eye position of the viewer obtained by the human eye tracking module,
  wherein the display panel is configured to display through the light transmitting regions of the liquid crystal grating a left eye image to the left eye of the viewer and a right eye image to the right eye of the viewer.

10. The 3D display device according to claim 9,
  wherein the first substrate comprises a plurality of first electrodes,
  wherein the second substrate comprises a second electrode configured to form an electric field with ones of the plurality of the first electrodes, and
  wherein the driving module is further configured to control voltages on ones of the plurality of the first electrodes and the second electrode based on a current eye position of the viewer obtained by the human eye tracking module, such that the liquid crystal grating forms the alternating light transmitting regions and the dark state regions.

11. The 3D display device according to claim 10, further comprising:
  a processing module coupled to the human eye tracking module and configured for to calculate a distance between the current eye position of the viewer and an initial position in a direction parallel to the left eye and the right eye of the viewer,
  wherein the initial position corresponds to the display configured to display, through the light transmitting regions of the liquid crystal grating, the left eye image to the left eye of the viewer and the right eye image to the right eye of the viewer,
  wherein the light transmitting regions of the liquid crystal grating are formed by factory setting voltages on the plurality of the first electrodes and the second electrode,
  wherein based on the current eye position of the viewer obtained by the human eye tracking module, the driving module is further configured to control voltages on the plurality of the first electrodes and the second electrode,
  wherein the distance comprises a first distance,
  wherein the liquid crystal grating forms the alternating light transmitting regions and the dark state regions based on a second distance between the current eye position of the viewer and the initial position obtained by the processing module, controlling voltages on the plurality of the first electrodes and the second electrode according to a correspondence table between the second distance and a corresponding voltage on one of the plurality of the first electrodes.

12. The 3D display device according to claim 9,
wherein the display panel comprises a liquid crystal display panel, and
wherein the liquid crystal grating is on a light entrance side or a light exit side of the liquid crystal display panel.

13. A method for driving a 3D display device, comprising a display panel, a liquid crystal grating, a human eye tracking module, and a driving module;
a first substrate and a second substrate opposite to each other;
a liquid crystal layer and a plurality of spacers, wherein the liquid crystal layer and the plurality of spacers are between the first substrate and the second substrate,
wherein the liquid crystal grating is configured to form alternating light transmitting regions and dark state regions when power is applied to the liquid crystal grating,
wherein along a first direction perpendicular to an extending direction of a light transmitting region of the light transmitting regions, the plurality of spacers are arranged periodically spaced apart by a distance comprising a period,
wherein a width of the light transmitting region is a positive integer multiple of the period,
the method comprising:
obtaining an eye position of a viewer by the human eye tracking module;
controlling the liquid crystal grating by the driving module to form alternating light transmitting regions and dark state regions based on a current eye position of the viewer obtained by the human eye tracking module, such that the display panel is configured to display through the light transmitting regions of the liquid crystal grating a left eye image to the left eye of the viewer and a right eye image to the right eye of the viewer.

14. The method according to claim 13, wherein the first substrate comprises a plurality of first electrodes, wherein the second substrate comprises a second electrode configured to form an electric field with ones of the plurality of the first electrodes, wherein the controlling the liquid crystal grating by the driving module to form alternating light transmitting regions and dark state regions based on a current eye position of the viewer obtained by the human eye tracking module comprises:
based on the current eye position of the viewer obtained by the human eye tracking module, controlling voltages on the plurality of the first electrodes and the second electrode by the driving module, such that the liquid crystal grating forms alternating light transmitting regions and dark state regions.

15. The method according to claim 14, wherein the distance comprises a first distance further comprising:
calculating a second distance between the current eye position of the viewer and an initial position in a direction parallel to the left eye and the right eye of the viewer by a processing module,
wherein the initial position corresponds to the display configured to display, through the light transmitting regions of the liquid crystal grating, the left eye image to the left eye of the viewer and the right eye image to the right eye of the viewer,
wherein the light transmitting regions of the liquid crystal grating are formed by factory setting voltages on the plurality of the first electrodes and the second electrode,
wherein based on a current eye position of the viewer obtained by the human eye tracking module, controlling voltages on the plurality of the first electrodes and the second electrode by the driving module, that that the liquid crystal grating forms alternating light transmitting regions and dark state regions,
wherein, based on the distance between the current eye position of the viewer and the initial position obtained by the processing module the driving module is configured to control voltages on the plurality of the first electrodes and the second electrode according to a correspondence table between the second distance and a corresponding voltage on one of the plurality of the first electrodes, such that the liquid crystal grating forms alternating light transmitting regions and dark state regions.

16. The liquid crystal grating according to claim 1,
wherein the second electrode comprises a plurality of second electrodes,
wherein a plurality of the second electrodes are arranged in parallel and insulated from each other, and
wherein the plurality of the second electrodes are strip-shaped,
wherein an extending direction of the second electrode is a same direction as an extending direction of one of the plurality of the first electrodes,
wherein the plurality of the second electrodes and the plurality of the first electrodes are staggered, and
wherein one of the plurality of the second electrodes has portions overlapping with two electrodes of the plurality of the first electrodes adjacent to the one of the plurality of the second electrodes.

17. The 3D display device according to claim 9,
wherein the display panel comprises an OLED display panel, and
wherein the liquid crystal grating is on a light exit side of the OLED display panel.

18. The 3D display device according to claim 9,
wherein the first substrate comprises a plurality of strip-shaped first electrodes arranged in parallel,
wherein the plurality of strip-shaped first electrodes are insulated from each other,
wherein the second substrate comprises a second electrode configured to form an electric field with the plurality of strip-shaped first electrodes;
wherein N continuously adjacent first electrodes of the plurality of strip-shaped first electrodes are used to form a light transmitting region, and
wherein N is a positive integer greater than or equal to 2.

19. The 3D display device according to claim 18,
wherein in a direction perpendicular to the plurality of strip-shaped first electrodes, starting from a first one of the plurality of strip-shaped first electrodes, Q spacers are arranged in a region where N continuously adjacent first electrodes are located,
wherein Q is a positive integer greater than or equal to 2, and
wherein Q spacers of the plurality of spacers are arranged in a row at equal intervals along the plurality of strip-shaped first electrodes.

20. The 3D display device according to claim 9,
wherein odd numbered ones of the plurality of strip-shaped first electrodes are located in a first layer,
wherein even numbered ones of the plurality of strip-shaped first electrodes are located in a second layer,
wherein the odd numbered ones of the plurality of strip-shaped first electrodes and the even numbered ones of the plurality of strip-shaped first electrodes are separated by an insulating layer, and
wherein an even numbered first electrode of the plurality of strip-shaped first electrodes has portions overlapping with two of the odd numbered ones of the plurality of strip-shaped first electrodes that are adjacent to the even numbered first electrode.

* * * * *